United States Patent
Kongkanand et al.

(10) Patent No.: US 10,320,004 B2
(45) Date of Patent: Jun. 11, 2019

(54) FUEL CELL WITH SEGREGATED ELECTROLYTE DISTRIBUTION AND METHOD FOR MAKING THE SAME

(71) Applicant: GM GLOBAL TECHNOLOGY OPERATIONS LLC, Detroit, MI (US)

(72) Inventors: Anusorn Kongkanand, Rochester Hills, MI (US); Michael K. Carpenter, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 15/593,383

(22) Filed: May 12, 2017

(65) Prior Publication Data

US 2018/0331368 A1    Nov. 15, 2018

(51) Int. Cl.

| | |
|---|---|
| *H01M 8/10* | (2016.01) |
| *H01M 4/88* | (2006.01) |
| *H01M 4/92* | (2006.01) |
| *H01M 8/1039* | (2016.01) |
| *H01M 8/1032* | (2016.01) |
| *H01M 8/1004* | (2016.01) |
| *C08J 5/22* | (2006.01) |
| *B01J 39/20* | (2006.01) |
| *B01J 47/12* | (2017.01) |
| *H01M 4/86* | (2006.01) |
| *H01M 8/1018* | (2016.01) |

(52) U.S. Cl.
CPC ......... *H01M 4/8892* (2013.01); *B01J 39/20* (2013.01); *B01J 47/12* (2013.01); *C08J 5/225* (2013.01); *H01M 4/8663* (2013.01); *H01M 4/8673* (2013.01); *H01M 4/881* (2013.01); *H01M 4/8828* (2013.01); *H01M 4/926* (2013.01); *H01M 8/1004* (2013.01); *H01M 8/1032* (2013.01); *H01M 8/1039* (2013.01); *H01M 2008/1095* (2013.01)

(58) Field of Classification Search
CPC .. H01M 4/8892; H01M 4/881; H01M 4/8828; H01M 4/926; H01M 8/1004; H01M 8/1032; H01M 8/1039; H01M 2008/1095; B01J 47/12; B01J 39/20; C08J 5/225
See application file for complete search history.

(56) References Cited

U.S. PATENT DOCUMENTS

| | | | | |
|---|---|---|---|---|
| 7,858,266 B2 * | 12/2010 | Fly | ...... | H01M 4/8605 427/115 |
| 2012/0301663 A1 * | 11/2012 | Koike | ...... | B82Y 30/00 428/114 |
| 2015/0180047 A1 * | 6/2015 | Hasegawa | ...... | H01M 4/8882 429/530 |

* cited by examiner

*Primary Examiner* — Raymond Alejandro
(74) *Attorney, Agent, or Firm* — Quinn IP Law

(57) ABSTRACT

A method of making a fuel cell including the following steps: comprising: (a) mixing carbon nanotubes (CNT) with an initial dispersion, wherein the initial dispersion includes an ionomer; (b) heating and stirring the initial dispersion to form a CNT-ionomer composite suspension; (c) after forming the CNT-ionomer composite suspension, mixing the CNT-ionomer composite suspension with an electrode catalyst solution to form an electrode ink, wherein the electrode catalyst solution includes a carbon black powder and a catalyst supported by the carbon black powder; and (d) coating a proton exchange membrane with the electrode ink to form the fuel cell electrode.

14 Claims, 2 Drawing Sheets

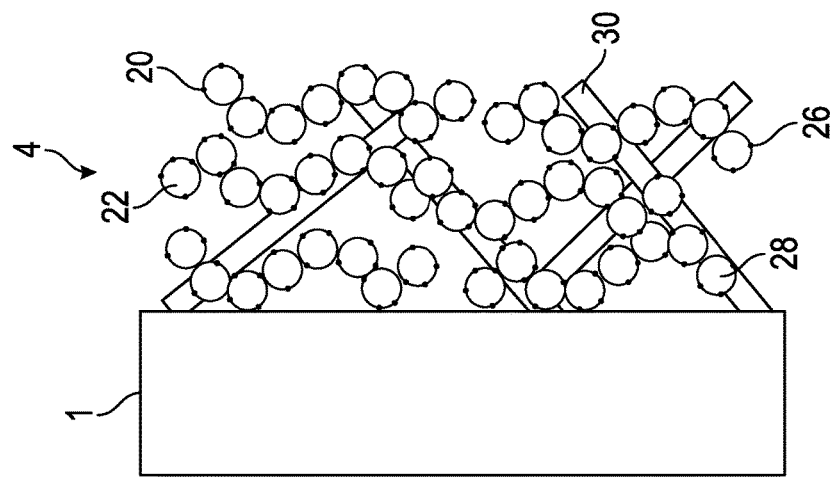
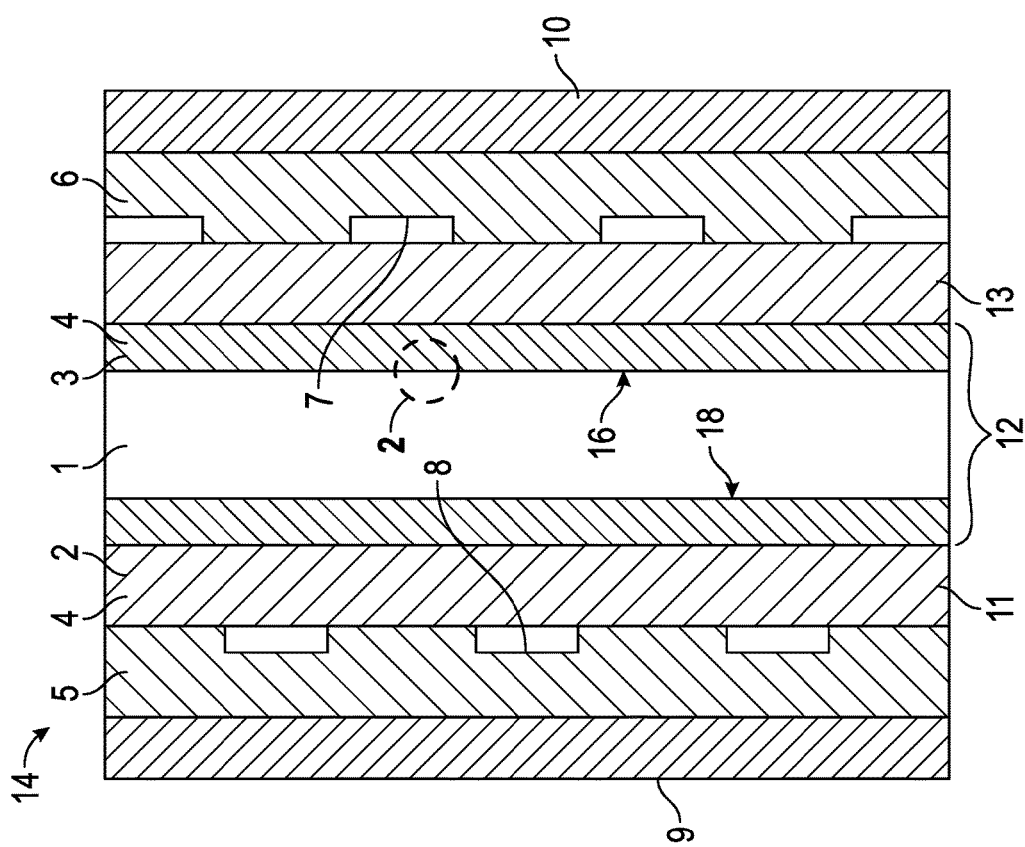

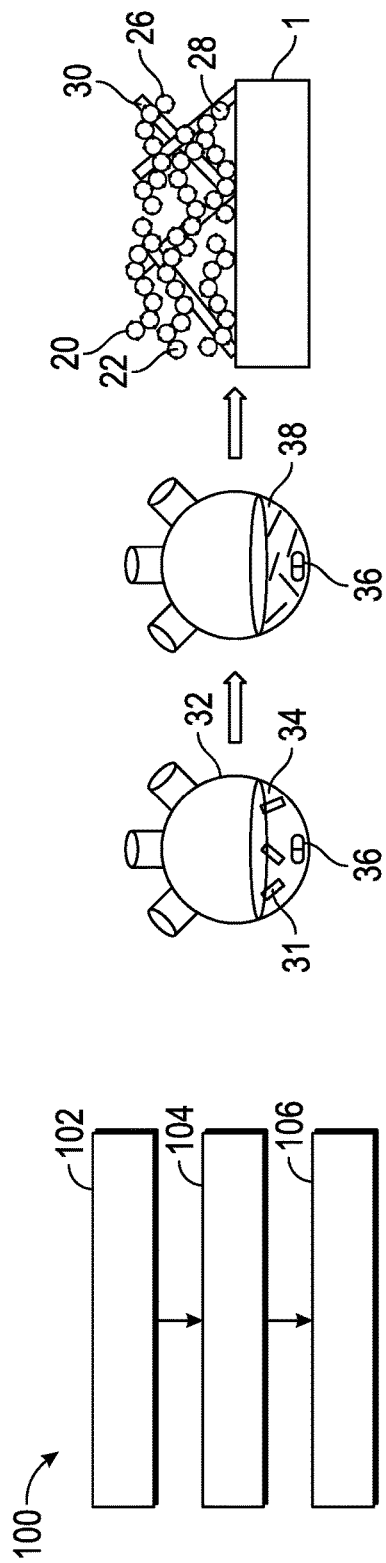

FUEL CELL WITH SEGREGATED ELECTROLYTE DISTRIBUTION AND METHOD FOR MAKING THE SAME

GOVERNMENT FUNDING

This invention was made with government support under contract number DE-EE0007271 awarded by Department of Energy. The government has certain rights in the invention.

INTRODUCTION

The present disclosure relates to fuel cells and, more particularly, to fuel cell electrodes with a segregated electrolyte distribution and methods for making the same.

A fuel cell membrane electrode assembly typically includes a polymer electrolyte membrane sandwiched between an anode and a cathode. During fuel cell operation, a fuel gas, such as hydrogen, is oxidized on the anode while an oxidant gas, such as oxygen, is reduced on the cathode. The electrochemical redox reactions on the anode and cathode are generally catalyzed by a metal catalyst, such as platinum. Electricity can be generated from such electrochemical reactions in a fuel cell at a high efficiency. A reactant gas (either the fuel gas or the oxidant gas) has a fast transport rate and minimal kinetic barrier to reach the reactive sites in a thin electrode layer, resulting in higher current density at a given cell voltage. Additionally, a catalyst is typically distributed uniformly through the single layer electrode configuration to ensure uniform current distribution.

SUMMARY

In a fuel cell, ionomer must be distributed uniformly throughout the electrode to ensure sufficient proton transport to all of the platinum surface. However, previous studies showed that ionomer adsorption on the platinum surface caused increased resistance to the transport of reactant oxygen gas to the platinum surface, and when the ionomer was removed from the surface, the loss could be mitigated. Moreover, because the ionomer is relatively fluid under fuel cell operating conditions, it is challenging to control local ionomer distribution. The present disclosure describes a fuel cell with a segregated electrolyte distribution that allows the ionomer to distribute uniformly in the cathode layer without coating all of the platinum (Pt) surfaces. As a result, in the presently disclosed fuel cell, sufficient oxygen and proton transport occurs to all the platinum surfaces to maintain good high-power performance. In addition, the present disclosure describes a method of making such fuel cell.

In the fuel cell electrode made by using the method described below, the ionomer is strongly associated with carbon nanotubes (CNT) to minimize the interaction between the ionomer and the platinum surface. Instead of mixing the catalyst with the ionomer together in one step, the ionomer is first associated with the CNTs in a separate container before adding the catalyst. During the pre-mix step, a poor solvent for both CNT and ionomer is used to generate a strongly associated CNT-ionomer composite that is harvested for subsequent ink preparation. This composite becomes well-dispersed in water (which turns black) and is stable for several days. The strong association between CNT and ionomer occurs because ionomer wraps around the CNTs. Fuel cells with cathodes made using this approach showed improvements in performance during testing at high-current densities (i.e., 40-60 mV at 2.5 A/cm$^2$). Specifically, the presently disclosed electrode made by the method described below balances proton conduction and oxygen transport in order to maximize energy conversion during the electrochemical reaction in the fuel cell.

A method of making a fuel cell includes the following steps: (a) mixing carbon nanotubes (CNT) with an initial dispersion, wherein the initial dispersion includes an ionomer; (b) heating and stirring the initial dispersion to form a CNT-ionomer composite suspension; (c) after forming the CNT-ionomer composite suspension, mixing the CNT-ionomer composite suspension with an electrode catalyst solution to form an electrode ink, wherein the electrode catalyst solution includes a carbon black powder and a catalyst supported on the carbon black powder; and (d) coating a proton exchange membrane with the electrode ink to form the fuel cell electrode.

The ionomer is included in an ionomer dispersion. The method may further include mixing water, n-propanol, and the ionomer dispersion to form the initial dispersion. Mixing the water, the n-propanol, and the ionomer dispersion includes stirring the water, n-propanol, and the ionomer dispersion. Mixing the carbon nanotubes with the initial dispersion includes adding the carbon nanotubes to the initial dispersion while stirring the initial dispersion. The carbon nanotubes may be graphitized carbon nanotubes. The initial dispersion may include 80 grams of the water, 8 grams of the n-propanol, and 1.8 grams of the graphitized carbon nanotubes. The carbon nanotubes may be multi-wall carbon nanotubes having a diameter ranging between 10 nanometers and 20 nanometers.

In this method, heating and stirring the initial dispersion may include stirring the initial dispersion with a magnetic stirrer rotating at about 350 revolutions per minute. Heating and stirring the initial dispersion may include heating the initial dispersion to a temperature ranging between 50 degrees Celsius and 100 degrees Celsius. Heating and stirring the initial dispersion may include simultaneously heating and stirring the initial dispersion for 2.5 hours. The method may further include continuing stirring the initial dispersion for 16 hours without heating the initial dispersion after simultaneously heating and stirring the initial dispersion for 2.5 hours. The method may further include comprising allowing the initial dispersion to cool through natural convection for 16 hours without heating the initial dispersion. The catalyst may include a plurality of platinum nanoparticles, and the platinum nanoparticles are deposited on the carbon black powder to form a catalyst-loaded carbon black powder. Mixing the CNT-ionomer composite with the electrode catalyst solution includes mixing the catalyst-loaded carbon black powder with water, n-propanol, and the CNT-ionomer composite suspension to form a segregated ionomer electrode ink. The segregated ionomer electrode ink may include 3.81 grams of the catalyst-loaded carbon black powder, 8.3 grams of n-propanol, 32.73 grams of water, and 56 grams of the CNT-ionomer composite suspension. The method may further include mixing the segregated ionomer electrode ink in a polymeric bottle containing $ZrO_2$ beads. Mixing the segregated ionomer electrode ink includes rolling the polymeric bottle. Each of the $ZrO_2$ beads may have a diameter of 5 millimeters. The method further includes coating the proton exchange membrane with the electrode ink while the electrode ink is still wet, and letting the electrode ink dry to form the fuel cell electrode.

The present disclosure also relates to a fuel cell. In some embodiments, the fuel cell includes a proton-conductive polymer electrolyte membrane and an electrode disposed on the proton-conductive polymer electrolyte membrane. The electrode includes a CNT-ionomer composite including carbon nanotubes and an ionomer coupled to the carbon nanotubes. The electrode further includes a carbon black powder coupled to the CNT-ionomer composite, and a plurality of platinum nanoparticles supported by the carbon black powder. Each of the carbon nanotubes has a diameter ranging between 10 and 20 nanometers. The CNT-ionomer composite may include a sulfonated tetrafluoroethylene based fluoropolymer-copolymer. The proton-conductive polymer electrolyte membrane may include a sulfonated tetrafluoroethylene based fluoropolymer-copolymer.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic cross-sectional view of a fuel cell according to an embodiment of the present disclosure.

FIG. 2 is a schematic enlarged illustration of a portion of the fuel cell shown in FIG. 1, taken around area 2.

FIG. 3 is a flowchart of a method for making a fuel cell electrode, including (1) preparing a carbon-nanotube (CNT)-ionomer composite suspension; (2) preparing an electrode ink; and (3) coating a proton exchange membrane (PEM) and/or a gas diffusion layer with the electrode ink.

FIG. 4 is schematic diagram of the method for preparing the CNT-ionomer composite suspension and subsequent coating.

FIG. 5 is a flowchart of a method for preparing the CNT-ionomer composite suspension.

FIG. 6 is a flowchart of a method for preparing the electrode ink.

DETAILED DESCRIPTION

FIG. 1 is a schematic cross-sectional view of an exemplary fuel cell 14 including a membrane electrode assembly (MEA) 12 having a layered electrode as described in detail below. The MEA 12 is sandwiched between a first gas diffusion layer 11 and a second gas diffusion layer 13. The membrane assembly comprises a proton-conductive polymer electrolyte membrane (PEM) 1 sandwiched between an anode layer 3 and a cathode layer 2. Each of the anode layer 3 and the cathode layer 2 is an electrode 4.

The PEM 1 may also be referred to as the proton exchange membrane and defines a first membrane surface 16 and a second membrane surface 18 opposite the first membrane surface 16. The anode layer 3 is disposed on the first membrane surface 16, and the cathode layer 2 is disposed on the second membrane surface 18. The PEM 1 may include any polyelectrolyte suitable for the fuel cell 14. The polymer electrolyte may include hydrocarbon- and fluorocarbon-based resins. Hydrocarbon-based electrolyte resins may include phenolic, sulfonic acid, sulfonamide, aromatic ketone, carboxylic acid containing resins; condensation resins such as phenol-formaldehyde, polystyrene, styrene-divinyl benzene copolymers, styrene-divinylbenzene-vinyl-chloride terpolymers, and the like. Fluorocarbon-based polymer electrolytes may include perfluorinated sulfonic acid polymers such as tetrafluoroethylene-perfluorosulfonyl ethoxyvinyl ether tetrafluoroethylene-hydroxylated (perfluoro vinyl ether) copolymers, and sulfonated perfluorocyclobutane copolymers. In certain cases, fluorocarbon-type resins having sulfonic, carboxylic, sulfonamide, sulfonylimide and/or phosphoric acid functionality are also used. Fluorocarbon-based resins typically exhibit excellent resistance to oxidation by oxygen, peroxide, strong acids and bases, and can be used in neat and composite electrolyte membranes where a reinforcing non-electrolyte material such as a PTFE (polytetrafluoroethylene) orientated porous film or fiber matrix is used as a mechanical framework. For example, a fluorocarbon-type resin having sulfonic acid group functionality is a sulfonated tetrafluoroethylene based fluoropolymer-copolymer sold by Dupont under the trade name NAFION®. Other fluorocarbon-based polymer electrolyte resins that can be useful in the PEM 1 include (co)polymers of olefins containing aryl perfluoroalkyl sulfonylimide cation-exchange groups. One such resin is p-STSI, an ion conductive material derived from free radical polymerization of styrenyl trifluoromethyl sulfonylimide (STSI) having the formula: styrenyl-SO2-NH—SO2CF3. Polymer electrolyte having an equivalent weight (EW) of about 400 to about 1000 may be used to cast the PEM 1 in the fuel cell 14.

The PEM 1 can be cast or otherwise formed from a composition comprising the polymer electrolyte. The polymer electrolyte composition in a form of solution, dispersion, emulsion, polymer melt, particles blend, or neat liquid blend may be used to prepare the membrane. Depending on the form and specific composition of the mixture, various membrane formation methods known to an ordinary skill may be used. Non-limiting exemplary membrane formation methods may include extrusion through a slot die, solution casting, fixed gap coating, spray casting, dip coating, drawdown rod coating, calendaring, brushing, impregnation of a reinforcing sheet material and blow molding.

The fuel cell 14 further includes a first gas flow distributor layer 5 and a second gas distribution layer 6 each having corresponding gas flow channels 8 and 7. Optionally, a first coolant plate 9 may be disposed over the first gas distribution layer 5, and a second coolant plate 10 may be disposed over the second gas distribution layer 6 for temperature control. As non-limiting examples, the first gas flow distributor layer 5 and the second gas distribution layer 6 may be plates wholly or partly made of graphite, carbon composites, carbon fiber composites, stainless steel plate, titanium plate, aluminum alloy plate, and gold plated metal plates.

The first gas diffusion layer 11 and the second gas diffusion layer 13 may include an electrically conductive porous matrix and an optional microporous layer. The electrically conductive porous matrix, may include, for example, a porous conductive foam (such as carbon foam, metal foam, etc.), conductive fiber matrix, or a conductive particle aggregate porous layer. A carbon fiber matrix may include at least one of a carbon paper, carbon fiber nonwoven sheet, carbon fiber woven cloth, and carbon fiber knitted cloth. For example, carbon cloth and paper materials sold by SGL group under the trade name SIGRACET® may be used for the first gas diffusion layer 11 and the second gas diffusion layer 13. The microporous layer may comprise electrically conductive particles, a hydrophobic agent and optionally a polymer electrolyte. The microporous layer may provide proper pore sizes for gas permeation, water management and enhancement of intimate electric contact with neighboring catalyst electrode layer. The electrically conductive particles may include carbon particles and any other conductive inert materials such as noble/transitional metals and their oxides. Carbon particles may include carbon black powder sold by Cabot Corporation under the trade name VULCAN® XC-72, acetylene black, and graphite. The hydrophobic agent may include, but is not limited to, polymers and copolymer of vinylidene fluoride, tetrafluoroethylene, ethylene, propylene, and hexafluoropropylene. A dispersion (e.g., a solution, a suspension, or a colloid) of polyvinylidenefluoride (PVDF), polytetrafluoroethylene (PTFE), or poly(tetrafluoroethylene-co-ethylene), for examples, may be used as the hydrophobic agent.

With reference to FIGS. 1 and 2, in certain embodiments, each of the anode layer 3 and the cathode layer 2 may be a single layer ultrathin electrode 4. Each of the electrodes 4 may include a catalyst 20 and a catalyst support material 22. In the present disclosure, the term "catalyst" means a material capable of catalyzing half-cell hydrogen oxidation on a fuel cell anode and/or half-cell oxygen reduction reaction on a fuel cell cathode. In some embodiments, the catalyst 20 may include platinum and/or any of its alloys. The catalyst 20 may include a binary alloy or a ternary alloy. Non-limiting binary catalyst may include alloys represented by one of the chemical formulas: $Pt_xCo_y$, $Pt_xRu_y$, $Pr_xMn_y$, $Pt_xNi_y$, $Pt_xIr_y$, and $Pt_xFe_y$, where x and y are real numbers between about 0.01 and 1. Non-limiting ternary catalyst may include alloys represented by a general formula: $Pt(M1)_x(M2)_y$, where M1 and M2 are transitional metal elements, x and y are real numbers between about 0.01 and 1. Examples of M1 and M2 include, but not limited to, Fe, Co, Mn, Ni, Ru, Pd, Ir or Cu. A ternary alloy comprising Pt, Mn and Co, with the ratio of Pt to combined Mn and Co ranged from 1:0.1 to 1:3 may be used in the electrodes 4. When Pt is included in the catalyst 20, the amount of platinum based on the active area of the electrode 4 may range from 0.05 mg/cm2 to about 0.4 mg/cm2. The percentage of platinum based on the combined catalyst and support weight, may range from about 10% to 95%, 15% to 50%, or 20% to 30%, depending on the type of catalyst support material 22 used and the thickness of the electrode 4. When a carbon black or other inorganic materials are used as the catalyst support, the weight percentage of Pt may range from 10% to about 40%. The catalyst 20 may include platinum and/or any of its alloys, as discussed above, and may have an average particle size between about 0.1 nanometer and about 1000 nanometers may be used. Accordingly, the catalyst 20 includes platinum nanoparticles 26. As used herein, the term "platinum nanoparticles" means particles including platinum and/or any of its alloys and having an average size between about 1 nanometer to about 1000 nanometers. The electrodes 4 generally have a thickness less than about 20 microns, 15 microns, 10 microns or 5 microns.

The catalyst support material 22 supports the catalyst 20 (e.g., platinum nanoparticles 26) and may include carbon black powder 28. Thus, the platinum nanoparticles 26 may be supported by the carbon black powder 28. The carbon black powder 28 may include particles with an average particle size between about 1 nanometers and 1000 nanometers. Primary particles of the catalyst support material 22 may be allowed to loosely adhere to each other to form aggregates, and the aggregates allowed to form conglomerates. As a result, there are a significant number of voids and pores within the aggregated or conglomerate structures. The amount and size of the pores depend on the particle size and how the particles organize to form the aggregates. Catalyst support material 22 having high surface area generally provide desirable porous structure and performance characteristics in the fuel cell 14 having the layered electrode configuration. A suitable catalyst support material 22 may have a Brunauer-Emmett-Teller (BET) surface area greater than about 30 m2/g, 250 m2/g, 500 m2/g, 1000 m2/g or 1500 m2/g. The catalyst support material 22 may include, for example, carbon black, graphitized carbon, and/or carbon black surface-modified with an organic hydrophilic group. Specific treatments can be applied to the catalyst support material 22 to increase or decrease the number of active centers available for deposition of a catalyst. Carbon blacks can be chemically modified to introduce functional groups that act as sites for platinum anchoring. Carbon black surface may also be chemically modified to include a hydrophilic organic group for enhanced hydrophilicity. For example, surface oxidation of carbon black at high temperatures in the presence of an acid can produce hydrophilic carboxylic acid groups (—COOH or its salt) on the carbon surface. Reaction of carbon black with an aromatic sulfonic acid azide (pre-formed or formed in-situ) allows the attachment of a hydrophilic aromatic sulfonic acid group on the surface of carbon. The aromatic sulfonic acid azide may be represented by a general chemical formula, X—N+2-Ar—SO3H, where Ar is an aromatic radical (such as phenylene or nathpthalene radicals), X is an anion, and —N+2- is an azide group. One example of carbon black powder 28 is sold by Cabot Corporation under the trade name VULCAN® XC-72. The carbon black may also be modified by or combined with an oxide, hydroxide, metal oxynitride, and doped metal oxide. Non-limiting inorganic oxides, oxynitrides and hydroxides may include the oxides, oxynitrides and hydroxides of silicone, titanium, aluminum, magnesium, zirconium, ruthenium, zinc, niobium, tantalum, molybdenum, and tin. Various mixtures of oxides, oxynitrides and hydroxides may also be used. Furthermore, a hydrophilic polymer or a polymer electrolyte may be deposited on or attached to the support material surface to enhance the hydrophilicity of the second electrode layer.

Each of the electrodes 4 may also include a carbon-nanotube (CNT)-ionomer composite 30 coupled to the catalyst support material 22 (e.g., the carbon black powder 28). The CNT-ionomer composite 30 includes an ionomer and carbon nanotubes blended with the ionomer. The "ionomer" is herein referred to as a polymeric electrolyte having a mobile ionic species for providing ionic conductivity. A proton conducting ionomer, for example, is particularly useful in a hydrogen or direct methanol fuel cell where proton species is generated and conducted through the PEM 1 in normal operations. Exemplary ionomers include perfluorosulfonic acid polymers, tetrafluoroethylene-perfluoro-3,6-dioxa-4-methyl-7-octenesulfonic acid copolymer, and a sulfonated tetrafluoroethylene based fluoropolymer-copolymer sold by Dupont under the trade name NAFION®. Additionally, the ionomer may be the tetrafluoroethylene-perfluorovinylether sulfonic acid copolymer sold by Asahi Kasei Chemicals Corporation under the trade name FLEMION® or the tetrafluoroethylene-perfluorovinylether sulfonic acid copolymers sold by Asahi Glass Co. Ltd. under the trade name ACIPLEX®. Ionomers may be prepared by incorporating perfluorovinyl ether groups terminated with sulfonate groups onto a tetrafluoroethylene backbone. An ionomer may be characterized by its equivalent weight (EW) which is defined as the weight of ionomers per mole of sulfonic acid group. A suitable ionomer may have an EW value between about 400 and 1500. Hydrocarbon based ionomers, such as poly(styrene sulfonic acid), sulfonated PPBP poly(4-phenoxylbenzoyl-1,4-phenylene), sulfoarylated PBI poly(benzylimidazole), and sulfonated PEEK (poly(ether ether ketone), may also be used. Different ionomers mentioned above may be combined and included in the electrodes 4. Each of the carbon nanotubes of the CNT-ionomer composite 30 has a diameter ranging between 10 nanometers and 20 nanometers. CNTs with high graphitization and with proper diameter (i.e., 10-20 nm) was selected to encourage the strong association with the ionomer. Careful selection of solvent system is also important. In some embodiments, carbon nanotubes of the CNT-ionomer composite 30 may be multi-walled carbon nanotubes (MW-CNT) with high graphitization. For instance, the number of graphene layers in the MWCNT may be about 35.

In fuel cell cathodes with small amounts of platinum, large performance losses at high power are observed. This is due to increased demand for the delivery of reactant gas and protons to the platinum surface. Previous studies showed that ionomer adsorption on the platinum surface was a primary source of this oxygen transport loss, and when the ionomer was removed from the surface, the loss could be mitigated. In addition, for an electrode to perform at high power, the ionomer must be distributed uniformly to ensure sufficient proton transport to all of the platinum surface. Moreover, because the ionomer is relatively fluid in under fuel cell operation, it is challenging to control local ionomer distribution. The presently disclosed fuel cell 14 facilitates segregated electrolyte distribution, thereby allowing the fuel cell to distribute the ionomer uniformly over the platinum surface. As a result, in the presently disclosed fuel cell 14, sufficient proton transport occurs over all the platinum surface. To achieve the desired proton transport, the presently disclose fuel cell 14 should be made using the method described below.

In the fuel cell electrode 4 made by using the method 100 described below, the ionomer is strongly associated with carbon nanotubes (CNT) to minimize the interaction between the ionomer and the platinum surface. Instead of mixing the catalyst 20 with the ionomer together in one step, the ionomer is first associated with the CNTs in a separate container before adding the catalyst. During the pre-mix step, poor solvent for CNT and the ionomer was used, so that only the strongly associated CNT-ionomer composite was harvested for further ink preparation. This CNT-ionomer composite has a strong association, because the ionomer is wrapped around the CNTs. Fuel cell test from this approach showed improvement in performance at high-current densities (i.e., 40-60 mV at 2.5 A/cm$^2$). Specifically, the presently disclosed electrode 4 made by the method 100 described below balances proton conduction and oxygen transport in order to maximize energy conversion during the electrochemical reaction.

FIG. 3 is a flowchart illustrating a method 100 for making the fuel cell 14 and the electrode 4. The method 100 begins at step 102, in which the CNT-ionomer composite is prepared as discussed in detail below. Then, the method 100 continues to step 104, in which an electrode ink is prepared. To prepare the electrode ink, the CNT-composite 30 is mixed with the catalyst 20 and the catalyst support material 22. After preparing the electrode ink, the method 100 continues to step 106, the PEM 1 is coated with the electrode ink. Specifically, the first membrane surface 16 and the second membrane surface 18 of the PEM 1 are coated with the electrode ink. Alternatively or additionally, the first gas diffusion layer 11 and a second gas diffusion layer 13 may be coated with the electrode ink.

With reference to FIGS. 4 and 5, step 102 entails preparing the CNT-ionomer composite 30 and includes several sub-steps. First, at sub-step 202, water, propanol, and an ionomer dispersion are mixed together in a first container 32 (e.g., a flask) to form an initial dispersion 34. In the present disclosure, the term "dispersion" includes solutions, colloids, and suspensions. Because the ionomer dispersion includes an ionomer, the initial dispersion includes an ionomer. As a non-limiting example, eighty (80) grams of water, eight (8) grams of n-propanol, and twenty-two point thirty-two (22.32) grams of an ionomer dispersion are mixed together in the first container 32. In certain embodiments, the ionomer dispersion includes twenty-one point five (21.5) weight percent (wt %) of the ionomer and seventy-eight point five (78.5) weight percent (wt %) of a solvent, and the solvent includes sixty (60) weight percent (wt %) of n-propanol and forty (40) weight percent (wt %) of water. For instance, the ionomer dispersion may be a sulfonated tetrafluoroethylene based fluoropolymer-copolymer dispersion sold by Dupont under the trade name NAFION® D2020. To mix the water, propanol, and the ionomer dispersion 34, a magnetic stirrer 36 may be rotated inside the first container 32 as shown in FIG. 4. Then, at sub-step 204, the carbon nanotubes 31 are added to the initial dispersion 34 in the first container 32 while the initial dispersion 34 is being stirred to form a mixture 38. For example, one point eight (1.8) grams of the graphitized carbon nanotubes can be added to the initial dispersion 34. The graphitized carbon nanotubes 31 may be multi-wall carbon nanotubes having a diameter ranging between 10 nanometers and 20 nanometers. CNTs 31 with high graphitization and with proper diameter (i.e., 10-20 nm) was selected to encourage the strong association with the ionomer.

Next, at sub-step 206, the mixture 38 is simultaneously stirred and heated. In certain embodiments, the mixture 38 is stirred, with the magnetic stirrer 36 rotating at about three hundred and fifty (350) revolutions per minute (rpm), and heated to a temperature ranging between 50 degrees Celsius and 100 degrees Celsius to facilitate mixing. For instance, the mixture 38 may be heated to about eighty (80) degrees Celsius. The heating and stirring of the mixture 38 occurs simultaneously for about for about two and a half (2.5) hours to ensure proper mixing. Then, at sub-step 208, the mixture 38 is allowed to cool while the mixture 38 is stirred overnight. In other words, after simultaneously heating and stirring the initial dispersion for about two and a half (2.5) hours, the initial dispersion is stirred for about sixteen (16) hours without heating the initial dispersion, while, simultaneously, allowing the initial dispersion to cool through natural convection to form a CNT-ionomer composite suspension.

With reference to FIGS. 3, 4, and 6, after forming the CNT-ionomer composite suspension, the method 100 continues to step 104, in which the electrode ink is formed. Step 104 includes several sub-steps. In sub-step, 302, the CNT-ionomer composite suspension is mixed with water, propanol, and the catalyst, in a second container (not shown) to form a segregated ionomer electrode coating. As a non-limiting example, fifty-six (56) grams of the CNT-ionomer composite suspension can be mixed with three point eighty-one (3.81) grams of the catalyst, the eight point three (8.3) grams of n-propanol, and thirty-two point seventy-three (32.73) grams of water. In this sub-step, stirring may be necessary to properly mix the CNT-ionomer composite suspension with water, propanol, and the catalyst. As discussed above, the catalyst 20 may include a plurality of platinum nanoparticles 26 deposited on the carbon black powder 28. Then, at sub-step 304, the form a segregated ionomer electrode coating is transferred from the second container (not shown) to polymeric bottle containing ZrO2 beads. The ZrO2 beads may have a diameter of five (5) millimeters. Next, at sub-step 306, the polymeric bottle containing the segregated ionomer electrode coating and the ZrO2 beads is rolled at sixty (60) RPMs for about twenty-four (24) hours to form an electrode ink.

After, as discussed above with respect to step 106, the PEM 1 and/or the first gas diffusion layer 11 and the second gas diffusion layer 13 are coated with the electrode ink while the electrode ink is still wet to form a thin layer having a thickness of about thirty-six (36) microns. Also at step 106, the wet layer of electrode ink is allowed to dry (through natural convection) to form the electrode 4. The fuel cell 14 made using the method 100 minimizes ionomer interaction with platinum while maintaining efficient and effective proton transport, thereby enhancing high-power fuel cell performance.

While the best modes for carrying out the disclosure have been described in detail, those familiar with the art to which this disclosure relates will recognize various alternative designs and embodiments for practicing the disclosure within the scope of the appended claims.

What is claimed is:

1. A method of making a fuel cell electrode, comprising:
    mixing water, n-propanol, and an ionomer dispersion to form an initial dispersion, wherein:
        the initial dispersion includes an ionomer;
        the ionomer is included in the ionomer dispersion; and
        mixing the water, the n-propanol, and the ionomer dispersion includes stirring the water, the n-propanol, and the ionomer dispersion;
    mixing carbon nanotubes (CNT) with the initial dispersion, wherein:
        mixing the carbon nanotubes with the initial dispersion includes adding the carbon nanotubes to the initial dispersion while stirring the initial dispersion; and
        the carbon nanotubes are graphitized carbon nanotubes;
    heating and stirring the initial dispersion to form a CNT-ionomer composite suspension;
    after forming the CNT-ionomer composite suspension, mixing the CNT-ionomer composite suspension with an electrode catalyst solution to form an electrode ink, wherein the electrode catalyst solution includes a carbon black powder and a catalyst supported by the carbon black powder; and
    coating a proton exchange membrane with the electrode ink to form the fuel cell electrode.

2. The method of claim 1, wherein the initial dispersion includes 80 grams of the water, 8 grams of the n-propanol, and 1.8 grams of the graphitized carbon nanotubes.

3. The method of claim 2, wherein the carbon nanotubes are multi-wall carbon nanotubes having a diameter ranging between 10 nanometers and 20 nanometers.

4. The method of claim 3, wherein heating and stirring the initial dispersion includes stirring the initial dispersion with a magnetic stirrer rotating at 350 revolutions per minute.

5. The method of claim 4, wherein heating and stirring the initial dispersion includes heating the initial dispersion to a temperature ranging between 50 degrees Celsius and 100 degrees Celsius.

6. The method of claim 5, wherein heating and stirring the initial dispersion includes simultaneously heating and stirring the initial dispersion for 2.5 hours.

7. The method of claim 6, further comprising, after simultaneously heating and stirring the initial dispersion for 2.5 hours, continuing stirring the initial dispersion for 16 hours without heating the initial dispersion.

8. The method of claim 7, further comprising allowing the initial dispersion to cool through natural convection.

9. The method of claim 8, wherein allowing the initial dispersion to cool through natural convection and continuing stirring the initial dispersion for 16 hours without heating the initial dispersion occur simultaneously.

10. The method of claim 9, wherein the catalyst includes a plurality of platinum nanoparticles, and the plurality of platinum nanoparticles are deposited on the carbon black powder to form a catalyst-loaded carbon black powder.

11. The method of claim 10, wherein mixing the CNT-ionomer composite suspension with the electrode catalyst solution includes mixing the catalyst-loaded carbon black powder with water, n-propanol, and the CNT-ionomer composite suspension to form a segregated ionomer electrode coating.

12. The method of claim 11, wherein the segregated ionomer electrode coating includes 3.81 grams of the catalyst-loaded carbon black powder, 8.3 grams of n-propanol, 32.73 grams of water, and 56 grams of the CNT-ionomer composite suspension.

13. The method of claim 12, further comprising mixing the segregated ionomer electrode coating in a polymeric bottle containing $ZrO_2$ beads to form the electrode ink, wherein mixing the segregated ionomer electrode coating includes rolling the polymeric bottle, and the each of the $ZrO_2$ beads has a diameter of 5 millimeters.

14. The method of claim 13, wherein the coating the proton exchange membrane with the electrode ink while the electrode ink is still wet, and letting the electrode ink dry to form the fuel cell electrode.

* * * * *